(12) United States Patent
Corredores et al.

(10) Patent No.: US 8,888,871 B2
(45) Date of Patent: Nov. 18, 2014

(54) PRODUCTION OF RENEWABLE BIOFUELS

(75) Inventors: Maria Magdalena Ramirez Corredores, Houston, TX (US); Vicente Sanchez Iglesias, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 396 days.

(21) Appl. No.: 13/339,811

(22) Filed: Dec. 29, 2011

(65) Prior Publication Data

US 2012/0216448 A1 Aug. 30, 2012

Related U.S. Application Data

(60) Provisional application No. 61/428,613, filed on Dec. 30, 2010.

(51) Int. Cl.
| | | |
|---|---|---|
| C10L 1/00 | (2006.01) | |
| C10G 69/14 | (2006.01) | |
| C10G 3/00 | (2006.01) | |
| C10L 1/18 | (2006.01) | |
| C10G 69/00 | (2006.01) | |
| C10L 1/02 | (2006.01) | |
| C10G 69/04 | (2006.01) | |
| C10L 1/04 | (2006.01) | |
| C10G 69/06 | (2006.01) | |
| C10B 49/22 | (2006.01) | |

(52) U.S. Cl.
CPC ............ *C10G 3/42* (2013.01); *C10G 2300/302* (2013.01); *C10G 69/14* (2013.01); *C10B 49/22* (2013.01); *C10G 3/50* (2013.01); *C10L 1/1817* (2013.01); *C10L 2290/543* (2013.01); *C10G 69/00* (2013.01); *C10L 2200/0469* (2013.01); *C10L 1/02* (2013.01); *C10G 69/04* (2013.01); *C10L 1/04* (2013.01); *C10G 69/06* (2013.01)

USPC .............................. 44/307; 585/240; 208/46

(58) Field of Classification Search
CPC ........... C10L 1/02; C10L 1/1817; C10L 1/04; C10L 2290/543; C10L 2200/0469; C10G 69/00; C10G 69/04; C10G 69/06; C10G 69/14; C10G 2300/302; C10G 2300/0469; C10G 3/50; C10G 3/42
USPC .............................. 44/307; 585/240; 208/46
See application file for complete search history.

(56) References Cited

U.S. PATENT DOCUMENTS

2010/0083566 A1    4/2010  Fredriksen et al.

FOREIGN PATENT DOCUMENTS

| CN | 101314724 | 12/2008 |
|---|---|---|
| CN | 101321847 | 12/2008 |

(Continued)

OTHER PUBLICATIONS

International Search Report and Written Opinion for co-pending PCT Application No. PCT/US2011/067805, filed Dec. 29, 2011; Dated May 7, 2012; 9 pages.

(Continued)

*Primary Examiner* — Cephia D Toomer
(74) *Attorney, Agent, or Firm* — Hovey Williams LLP

(57) ABSTRACT

Renewable fuels are produced in commercial quantities and with enhanced efficiency by integrating a bio-oil production system with a conventional petroleum refinery so that the bio-oil is co-processed with a petroleum-derived stream in the refinery. The techniques used to integrate the bio-oil production system and conventional petroleum refineries are selected based on the quality of the bio-oil and the desired product slate from the refinery.

25 Claims, 2 Drawing Sheets

(56) References Cited

FOREIGN PATENT DOCUMENTS

| | | | |
|---|---|---|---|
| CN | 101668833 | | 3/2010 |
| EP | 1693432 | * | 8/2006 |
| JP | 2010-121071 | | 6/2010 |
| WO | WO2010049075 | * | 5/2010 |
| WO | 2010/062611 | | 6/2010 |

OTHER PUBLICATIONS

Qi et al.; Review of biomass pyrolysis oil properties and upgrading research; Energy Conversion and Management 48 (2007); 87-92, Jun. 22, 2006.

Elliott et al.; Liquid Fuels by Low-Severity Hydrotreating of Biocrude, Developments in Thermochemical Biomass Conversion; vol. 1, pp. 611-621, A.V. Bridgewater and DGB Boocock, Blackie Academic & Professional, Longon: 1996.

Diebold et al.; Additives to Lower and Stabilize the Viscosity of Pyrolysis Oils during Storage; Energy Fuels, 1997, 11 (5); pp. 1081-1091; Sep. 18, 1997, Abstract.

Chinese Office Action dated Aug. 14, 2014 issued in related Chinese Patent Application No. 201180061583.3, 10 pages.

* cited by examiner

PRODUCTION OF RENEWABLE BIOFUELS

BACKGROUND

1. Field of the Invention

The present invention relates generally to the production of renewable fuels. More specifically, the invention concerns the integration of a biomass conversion facility with a conventional refinery to efficiently produce commercial quantities of renewable fuels.

2. Description of the Related Art

With the rising costs and environmental concerns associated with fossil fuels, renewable energy sources base become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils that are highly unstable and often contain high amounts of oxygen. These bio-oils require extensive secondary upgrading in order to be utilized as transportation fuels and/or as fuel additives due their instability. Furthermore, the transportation fuels and/or fuel additives derived from bio-oil vary in quality depending on factors affecting the stability of the bio-oil, such as the original oxygen content of the bio-oil.

Bio-oils can be subjected to various upgrading processes in order to process the bio-oil into renewable fuels and or fuel additives. However, prior upgrading processes have been relatively inefficient and produce renewable fuels and/or fuel additives that have limited use in today's market. Furthermore, only limited amounts of these bio-oil derived transportation fuels and/or fuel additives may be combinable with petroleum-derived gasoline or diesel.

Accordingly, there is a need for an improved process and system for using bio-oil to produce renewable fuels.

SUMMARY OF THE INVENTION

In one embodiment, the present invention is directed to a process thr producing a renewable fuel, where the process comprises the steps of (a) providing one or more bio-nils selected from the group consisting of a high-stability bio-oil, an intermediate-stability bio-oil, and a low-stability bio-oil, wherein the high-stability bio-oil has a stability parameter of less than 30 centipoise per hour (cp/h), the intermediate-stability bio-oil has a stability parameter in the range of 30 to 75 cp/h, and the low-stability bio-oil has a stability parameter greater than 75 cp/h; and (b) processing at least one of the bio-oils in a petroleum refinery according to one or more of the following methods: (i) combining at least a portion of the high-stability bio-oil with a first petroleum-derived stream of the petroleum refinery to thereby form a first combined stream, hydrotreating the first combined stream to thereby produce a first hydrotreated stream, and fractionating the first hydrotreated stream; (ii) combining at least a portion of the high-stability bio-oil with a second petroleum-derived stream of the petroleum refinery to thereby form a second combined stream, catalytically cracking the second combined stream to thereby produce a second cracked stream, and fractionating the second cracked stream; (iii) combining at least a portion of the intermediate-stability bio-oil with a third petroleum-derived stream of the petroleum refinery to thereby thrill a third combined stream, hydrotreating the third combined stream to thereby produce a third hydrotreated stream, catalytically cracking at least a portion of the third hydrotreated stream to thereby produce a third cracked stream, and fractionating the third cracked stream; (iv) combining at least a portion of the intermediate-stability bio-oil with a fourth petroleum-derived stream of the petroleum refinery to thereby form a fourth combined stream, hydrotreating the fourth combined stream to thereby produce a fourth hydrotreated stream, thermally cracking at least a portion of the fourth hydrotreated stream to thereby produce a fourth cracked stream, and fractionating the fourth cracked stream; (v) combining at least a portion of the low-stability bio-oil with a fifth petroleum-derived stream of the petroleum refinery to thereby form a fifth combined stream, thermally cracking at least a portion of the fifth combined stream to thereby produce a fifth cracked stream, and fractionating the fifth cracked stream; and/or (vi) combining at least a portion the low-stability bio-oil with a sixth petroleum-derived stream of the petroleum refinery to thereby form a sixth combined stream, fractionating at least a portion of the sixth combined stream into at least a sixth heavy bio-fraction and a sixth light bio-fraction, hydrotreating at least a portion of the sixth light bio-fraction to thereby produce a sixth hydrotreated bio-fraction, and thermally cracking at least a portion of the sixth heavy bio-fraction to thereby produce a sixth thermally cracked bio-fraction.

In another embodiment, the present invention is directed to a system for producing renewable fuels, where the system comprises (a) a bio-oil production facility comprising a biomass conversion reactor for converting biomass into bio-oil; (b) a petroleum refinery for refining petroleum products; and (c) an integration system for optionally combining at least a portion of the bio-oil from the bio-oil production facility with one or more petroleum-derived streams in the petroleum refinery for co-processing therewith. In another embodiment, the bio-oil can be co-processed with one or more petroleum-derived streams without first combining the two streams (i.e. charging each stream to the conversion unit as a separate feed). The integration system comprises at least one of a first, second, third, fourth, fifth, and/or sixth integration mechanism for combining at least a portion of the bio-oil with at least one of the petroleum-derived streams. The refinery comprises one or more of the following refining systems: (i) a first hydrotreating unit and a first fractionator, wherein the first hydrotreating unit is located downstream of the first integration mechanism and the first fractionator is located downstream of the first hydrotreating unit; (ii) a second catalytic cracking unit and a second fractionator, wherein the second catalytic cracking unit is located downstream of the second integration mechanism and the second fractionator is located downstream of the second catalytic cracking unit; (iii) a third hydrotreating unit, a third catalytic cracking unit, and a third fractionator, wherein the third hydrotreating unit is located downstream of the third integration mechanism, wherein the third catalytic cracking unit is located downstream of the third hydrotreating unit, wherein the third fractionator is located downstream of the third catalytic cracking unit; (iv) a fourth hydrotreating unit, a fourth hydrocracking unit, and a fourth fractionator, wherein the fourth hydrotreating unit is located downstream of the fourth integration mechanism, wherein the fourth hydrocracking unit is located downstream of the fourth hydrotreating unit, wherein the fourth fractionator is located downstream of the fourth hydrocracking unit; (v) a fifth thermal cracking unit and a fifth fractionator, wherein the fifth thermal cracking unit is located downstream of the fifth integration mechanism and the fifth fractionator is located downstream of the fifth thermal cracking unit; and/or (vi) a sixth fractionator, a sixth thermal cracking unit, and a sixth hydrotreating unit, wherein the sixth fractionator is located downstream of the sixth integration mechanism, wherein the sixth thermal cracking unit is located downstream of the sixth fractionator, and the sixth hydrotreating unit is located downstream of the sixth fractionator.

DETAILED DESCRIPTION

Figure 1:
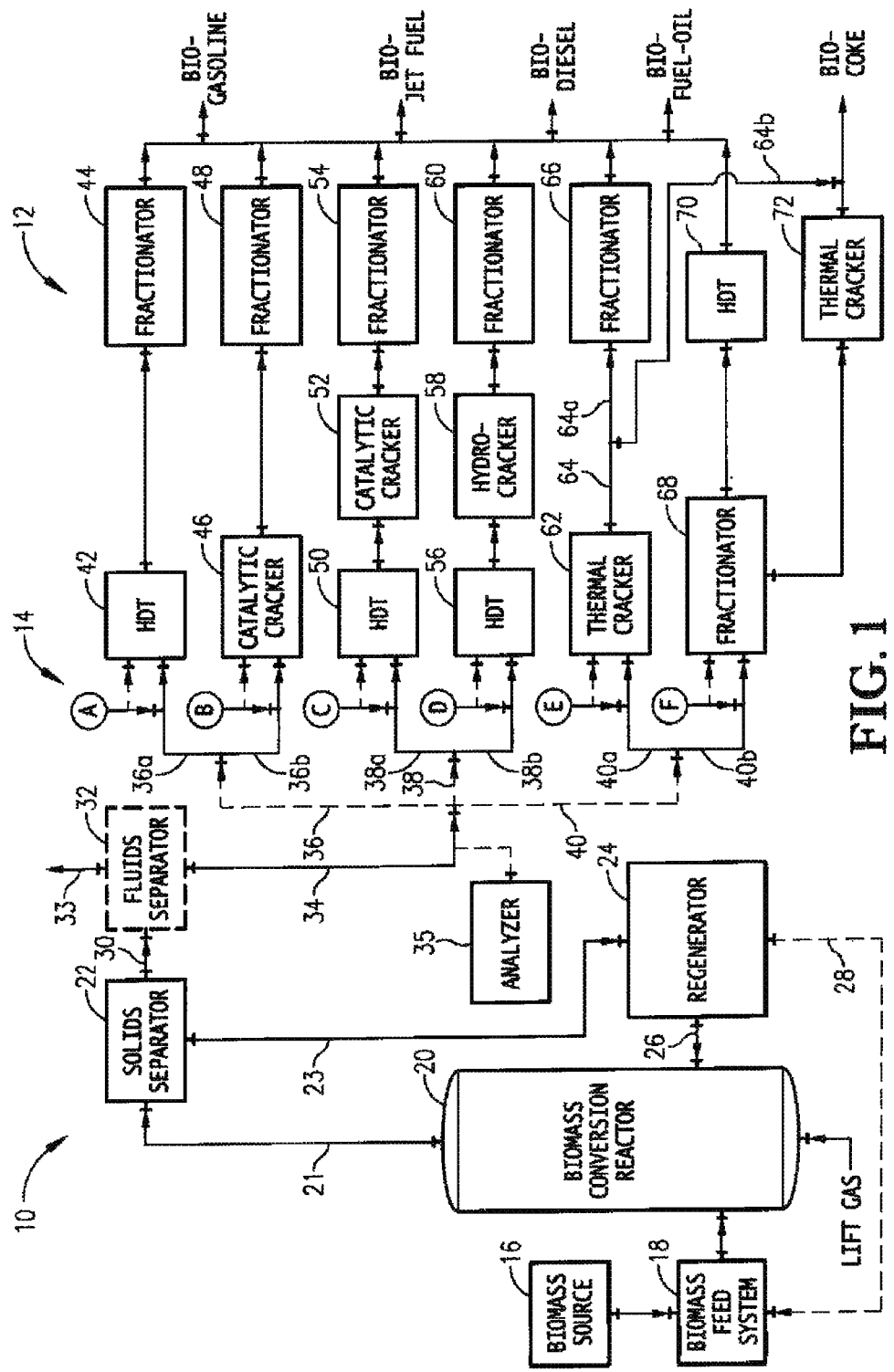
FIG. 1 is a schematic diagram of an integrated biomass conversion and petroleum refining system according to one embodiment of the present invention.

FIG. 1 depicts an integrated system for producing renewable fuels from biomass and traditional petroleum-derived streams. In particular, FIG. 1 illustrates a biomass conversion system 10 that is integrated with a petroleum refinery 12 via an integration system 14. As discussed in further detail below, the manner in which the biomass conversion system 10 is integrated into the petroleum refinery 12 can vary based on various properties, such as stability and/or oxygen content, of the produced bio-oil and the desired product slate from the petroleum refinery 12. As shown in FIG. 1, integration of the biomass conversion system 10 and the petroleum refinery 12 can allow for the commercial scale production of renewable fuels such as, for example, bio-gasoline, bio-jet fuel, bio-diesel, bio-fuel oil, and/or bio-coke.

The biomass conversion system 10 of FIG. 1 includes a biomass source 16 for supplying a biomass feedstock to be converted to bio-oil. The biomass source 16 can be, for example, a hopper, storage bin, railcar, over-the-road trailer, or any other device that may hold or store biomass. The biomass supplied by the biomass source 16 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 16 can be supplied to a biomass feed system 18. The biomass feed system 18 can be any system capable of feeding solid particulate biomass to a biomass conversion reactor 20. While in the biomass feed system 18, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 18 prior to introducing the biomass into the biomass conversion reactor 20. Alternatively, the catalyst may be introduced directly into the biomass conversion reactor 20. The catalyst may be fresh and/or regenerated catalyst. The catalyst can, for example, comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated firms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 20, they are not considered catalysts.

The biomass feed system 18 introduces the biomass feedstock into a biomass conversion reactor 20. In the biomass conversion reactor 20, biomass is subjected to a conversion reaction that produces bio-oil. The biomass conversion reactor 20 can facilitate different chemical conversion reactions such as fast pyrolysis, slow pyrolysis, liquefaction, gasification, or enzymatic conversion. The biomass conversion reactor 20 can be, for example, a fluidized bed reactor, a cyclone reactor, an ablative reactor, or a riser reactor.

In one embodiment, the biomass conversion reactor 20 can be a riser reactor and the conversion reaction can be fast pyrolysis. More specifically, fast pyrolysis may include catalytic cracking. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, noncondensable gases recycled from the biomass conversion process, and/or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

Referring again to FIG. 1, the conversion effluent 21 exiting the biomass conversion reactor 20 generally comprises gas, vapors, and solids. As used herein, the vapors produced during the conversion reaction may interchangeably be referred to as "bio-oil," which is the common name for the vapors when condensed into their liquid state.

In one embodiment of the present invention, the conversion reaction carried on the biomass conversion reactor 20 produces a bio-oil of high-stability. Such high-stability bio-oil has a stability parameter of less than 30 centipoise per hour (cp/h). In certain embodiments, the high-stability bio-oil can have an oxygen content of less than 15 percent by weight. In another embodiment of the present invention, the conversion reaction carried out in the biomass conversion reactor 20 produces a bio-oil of intermediate-stability. Such intermediate-stability bio-oil has a stability parameter in the range of 30 to 75 cp/h. In certain embodiments, the intermediate-stability bio-oil can have an oxygen content in the range of 15 to 18 percent by weight. In still another embodiment of the present invention, the conversion reaction carried out in the biomass conversion reactor 20 produces a bio-oil of low-stability. Such low-stability bio-oil has a stability parameter greater than 75 cp/h. In certain embodiments, the low-stability bio-oil can have an oxygen content greater than 18 percent by weight.

As used herein, the "stability parameter" of a bio-oil is defined as the slope of a best-fit straight line for a plot of bio-oil viscosity (centipoises) over time (hours), where the plotted viscosity values are determined while the bio-oil is aged at 90° C. on samples taken at the onset of aging (time=0 hours), 8 hours from the onset of aging, 24 hours from the onset of aging, and 48 hours from the onset of aging. Only data points exhibiting a correlation coefficient greater than 0.9 ($R^2$>0.9) are used to determine the stability parameter.

Figure 2:
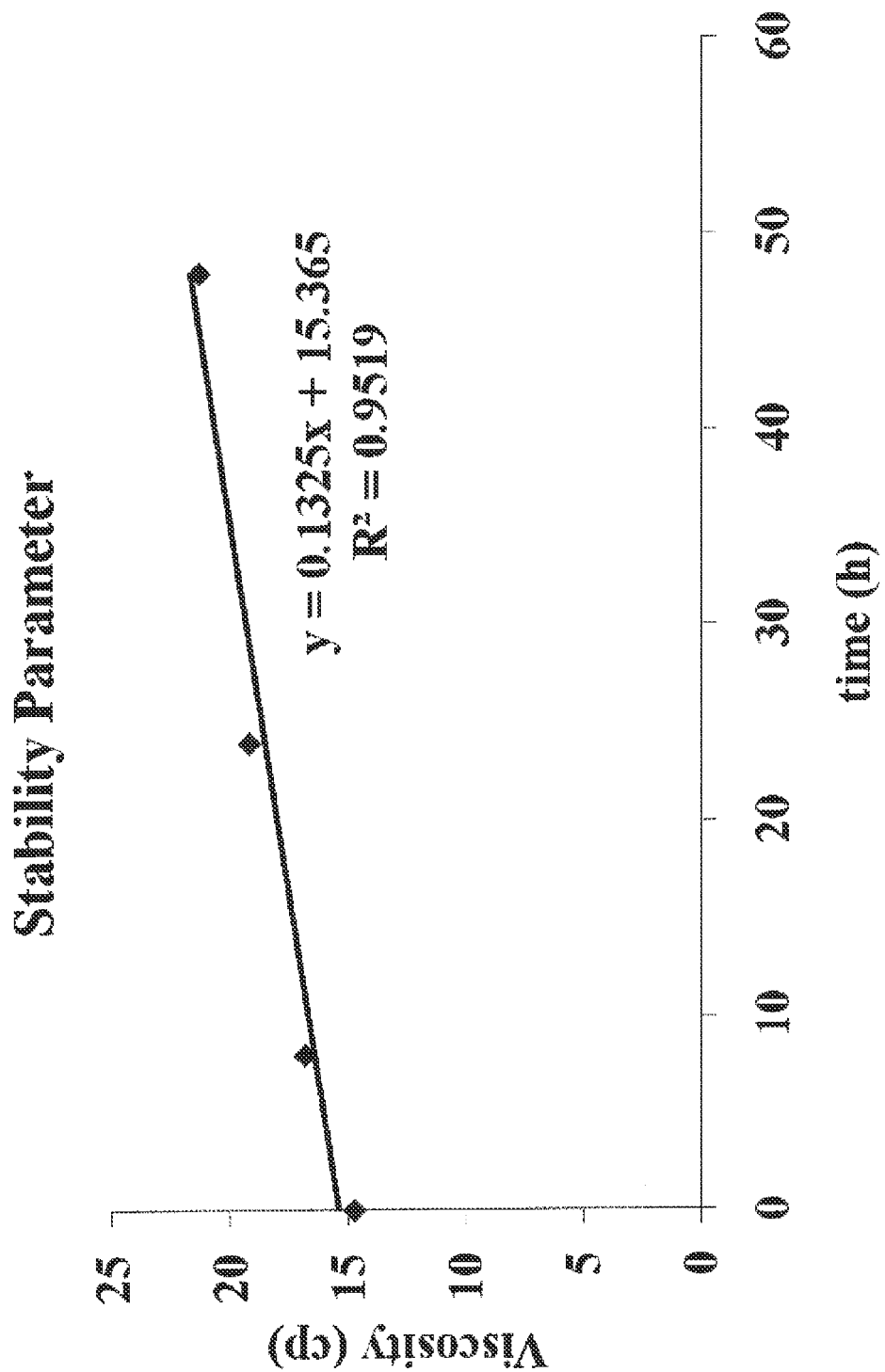
FIG. 2 is an exemplary stability parameter plot showing the change in bio-oil viscosity as a function of time for a high-stability bio-oil having a stability parameter (slope of the straight line fit) of 0.1325 centipoise per hour.

FIG. 2 provides an exemplary stability parameter plot where the slope of the best-fit straight line (i.e., the stability parameter) is 0.135 cp/h and the correlation coefficient ($R^2$) for all four data points (times=0, 8, 24, and 48 hours) is 0.9519. Since the stability parameter for the bio-oil tested in FIG. 2 is less than 30 cp/h, the bio-oil would be considered a "high-stability bio-oil."

Although FIG. 1 depicts only one biomass conversion system 10 with a single biomass conversion reactor 20, certain embodiments of the present invention may employ multiple biomass conversion systems or multiple biomass conversion reactors to convert the same or different biomass feedstocks into a plurality of individual bio-oil streams having different stability properties. Two or more of these bio-oil streams of varying stability can be simultaneously integrated into the petroleum refinery 12 in accordance with the integration techniques discussed in detail below.

When fast pyrolysis is carried out in the biomass conversion reactor 20, the conversion effluent 21 generally comprises solid particles of char, ash, and/or spent catalyst. The conversion effluent 21 can be introduced into a solids separator 22. The solids separator 22 can be any conventional device capable of separating solids from gas and vapors such as, for example, a cyclone separator or a gas filter. The solids separator 22 removes a substantial portion of the solids (e.g., spent catalysts, char, and/or heat carrier solids) from the conversion effluent 21. The solid particles 23 recovered in the solids separator 22 can be introduced into a regenerator 24 for regeneration, typically by combustion. After regeneration, at least a portion of the hot regenerated solids can be introduced directly into the biomass conversion reactor 20 via line 26. Alternatively or additionally, the hot regenerated solids can be directed via line 28 to the biomass feed system 18 for combination with the biomass feedstock prior to introduction into the biomass conversion reactor 20.

The substantially solids-free fluid stream 30 exiting the solids separator 22 can then be introduced into an optional fluids separator 32. In one embodiment, it is preferred that the bio-oil entering the fluids separator 32 has not previously been subjected to a deoxygenation process such as, for example, hydrotreating. The fluids separator 32 can be any system capable of separating unwanted fluid components 33 from the solids-free fluid stream 30 to provide the desired bio-oil 34. The identity of the unwanted fluid components 33 may vary depending on many factors; however, common unwanted components may include noncondensable gases and/or water. The unwanted fluid components 33 may also include components, such as certain olefins, that are more valuable as individual products rather than as renewable feeds to the petroleum refinery.

As discussed previously, the separated bio-oil 34 is integrated into the petroleum refinery 12 based on the stability of the bio-oil 34 and the desired product slate of the refinery 12. In one embodiment, an optional analyzer 35 is provided to determine the stability parameter and/or the oxygen content of the bio-oil 34 so that the optimal method of integration can be chosen based on the stability parameter and/or the oxygen content of the bio-oil 34 as measured by the analyzer 35.

When the bio-oil 34 exhibits a stability parameter of less than 30 cp/h and/or has an oxygen content of less than 15 weight percent, such high-stability bio-oil is routed through line 36 of the integration system 14. When the bio-oil 34 exhibits a stability parameter in the range of 30 to 75 cp/h and/or has an oxygen content of 15 to 18 weight percent, such intermediate-stability bio-oil is routed through line 38 of the integration system 14. When the bio-oil 34 exhibits a stability parameter greater than 75 cp/h and/or has an oxygen content greater than 18 weight percent, such low-stability bio-oil is routed through line 40 of the integration system 14. The integration system 14 can introduce the bio-oil 34 into the conventional petroleum refinery 12 at one or more appropriate locations, in the appropriate amount, and under the appropriate conditions so the bio-oil is co-processed with a petroleum-derived stream of the refinery. The petroleum-derived stream with which the bio-oil 34 is co-processed can be, for example, virgin gasoil/diesel, light cycle oil (LCO), light catalytic-cycle oil (LCCO), atmospheric residue (AR), deasphalted oil (DAO), heavy crude oil (HCO), heavy catalytic-cycle oil (HCCO), vacuum gas oil (VGO), and/or vacuum residue (VR).

When the biomass conversion system 10 produces a high-stability bio-oil, the integration system 14 can direct the high-stability bio-oil to a first treatment process via lines 36 and 36a and/or to a second treatment process via lines 36 and 36b.

In the first treatment process, the high-stability bio-oil in line 36a can be combined with a first conventional petroleum-derived stream "A" of the refinery 12. As used herein, "conventional" is understood to encompass any facility, apparatus, or plant whose purpose and function is in conjunction with the accepted standards and/or well known practices in the relevant art concerning petroleum refining or petrochemicals production. The amount of the high-stability bio-oil combined with the first petroleum-derived stream A can be at least 0.01, 0.1, 1, or 2 percent and/or not more than 50, 25, 10, or 5 percent by weight of the combined streams. The first petroleum-derived stream A can be, for example, virgin gasoils/diesel, light cycle oil (LCO), and/or light conversion-cycle oil (LCCO). The combining of the high-stability bio-oil and the first petroleum-derived stream A can take place upstream of a conventional hydrotreater 42 of the refinery 12. Alternatively, the combining of the high-stability bio-oil and the first petroleum-derived stream A can take place within the conventional hydrotreater 42. In one embodiment, the hydrotreater 42 is a conventional diesel hydrotreating unit of the petroleum refinery 12. In the hydrotreater 42, the combined stream is subjected to hydrotreatment to thereby produce a hydrotreated stream that can then be subjected to fractionation in a first fractionator 44. Such fractionation can produce one or more of the following renewable fuel products: bio-gasoline, bio-jet fuel, bio-diesel, bio-fuel oil, and/or bio-coke.

In the second treatment process, the high-stability bio-oil in line 36h can be combined with a second conventional petroleum-derived stream "B" of the refinery 12. The amount of the high-stability bio-oil combined with the second petroleum-derived stream B can be at least 0.01, 0.1, 1, or 2 percent and/or not more than 50, 25, 10, or 5 percent by weight of the combined streams. The second petroleum-derived stream B can be, for example, atmospheric residue (AR), deasphalted oil (DAO), vacuum gas oil (VGO), heavy catalytic-cycle oil (HCCO), and/or vacuum residue (VR). The combining of the high-stability bio-oil and the second petroleum-derived stream B can take place upstream of a conventional catalytic cracker 46 of the refinery 12. Alternatively, the combining of the high-stability bio-oil and the second petroleum-derived stream B can take place within the conventional catalytic cracker 46. In one embodiment, the catalytic cracker 46 is a conventional fluid catalytic cracking (FCC) unit or a conventional resid fluid catalytic cracking (RFCC) unit of the petroleum refinery 12. In the catalytic cracker 46, the combined stream is subjected to catalytic cracking to thereby produce a catalytically cracked stream that can then be subjected to fractionation in a second fractionator 48. Such fractionation can produce one or more of the following renewable fuel products: bio-gasoline, bio-jet fuel, bio-diesel, bio-fuel oil, and/or bio-coke.

When the biomass conversion system 10 produces an intermediate-stability bio-oil, the integration system 14 can direct the intermediate-stability bio-oil to a third treatment process via lines 38 and 38a and/or to a fourth treatment process via lines 38 and 38b.

In the third treatment process, the intermediate-stability bio-oil in line 38a can be combined with a third conventional petroleum-derived stream "C" of the refinery 12. The amount of the intermediate-stability bio-oil combined with the third petroleum-derived stream C can be at least 0.01, 0.1, 1, or 2 percent and/or not more than 50, 25, 10, or 5 percent by weight of the combined streams. The third petroleum-derived stream C can be, for example, light cycle oil (LCO), and/or light conversion-cycle oil (LCCO), deasphalted oil (DAO), vacuum gas oil (VGO), and/or heavy catalytic-cycle oil (HCCO). The combining of the intermediate-stability bio-oil and the third petroleum-derived stream C can take place upstream of a conventional hydrotreater 50 of the refinery 12. Alternatively, the combining of the intermediate-stability bio-oil and the third petroleum-derived stream C can take place within the conventional hydrotreater 50. In the hydrotreater 50, the combined stream is subjected to hydrotreatment to thereby produce a hydrotreated stream that can then be subjected to catalytic cracking in a conventional catalytic cracker 52 of the refinery 12. In one embodiment, the catalytic cracker 52 is a conventional fluid catalytic cracking (FCC) unit and the hydrotreater 50 located upstream of the catalytic cracker 52 is a conventional FCC-feed pre-treater. The cracked stream exiting the catalytic cracker 52 can then be subjected to fractionation in a third fractionator 54. Such fractionation can produce one or more of the following renewable fuel products: bio-gasoline, bio-jet fuel, bio-diesel, bio-fuel oil, and/or bio-coke.

In the fourth treatment process, the intermediate-stability bio-oil in line 38b can be combined with a fourth conventional petroleum-derived stream "D" of the refinery 12. The amount of the intermediate-stability bio-oil combined with the fourth petroleum-derived stream D can be at least 0.01, 0.1, 1, or 2 percent and/or not more than 50, 25, 10, or 5 percent by weight of the combined streams. The fourth petroleum-derived stream D can be, for example, light cycle oil (LCO), and/or light conversion-cycle oil (LCCO), deasphalted oil (DAO), vacuum gas oil (VGO), and/or heavy catalytic-cycle oil (HCCO). The combining of the intermediate-stability bio-oil and the fourth petroleum-derived stream D can take place upstream of a conventional hydrotreater 56 of the refinery 12. Alternatively, the combining of the intermediate-stability bio-oil and the fourth petroleum-derived stream D can take place within the conventional hydrotreater 56. In the hydrotreater 56, the combined stream is subjected to hydrotreatment to thereby produce a hydrotreated stream that can then be subjected to hydrocracking in a conventional hydrocracker 58 of the refinery 12. In one embodiment, the hydrocracker 58 is a conventional hydrocracking unit. The cracked stream exiting the hydrocracker 58 can then be subjected to fractionation in a fourth fractionator 60. Such fractionation can produce one or more of the following renewable fuel products: bio-gasoline, bio-jet fuel, bio-diesel, bio-fuel oil, and/or bio-coke.

When the biomass conversion system 10 produces a low-stability bio-oil, the integration system 14 can direct the low-stability bio-oil to a fifth treatment process via lines 40 and 40a and/or to a sixth treatment process via lines 40 and 40b.

In the fifth treatment process, the low-stability bio-oil in line 40a can be combined with a fifth conventional petroleum-derived stream "E" of the refinery 12. The amount of the low-stability bio-oil combined with the fifth petroleum-derived stream E can be at least 0.01, 0.1, 1, or 2 percent and/or not more than 50, 25, 10, or 5 percent by weight of the combined streams. The fifth petroleum-derived stream E can be, for example, light cycle oil (LCO), and light conversion-cycle oil (LCCO), vacuum residue (VR). The combining of the low-stability bio-oil and the fifth petroleum-derived stream E can take place upstream of a conventional thermal cracker 62 of the refinery 12. Alternatively, the combining of the low-stability bio-oil and the fifth petroleum-derived stream E can take place within the conventional thermal cracker 62. In the thermal cracker 62, the combined stream is subjected to thermal cracking to thereby produce a cracked stream 64 that is then removed from the thermal cracker 62. The cracked stream 64 can then be divided into a stabilized cracked stream 64a and a bio-coke stream 64b. The stabilized cracked stream 64a can then be subjected to fractionation in a fifth fractionator 66, while the bio-coke stream 64b is removed from the system. In one embodiment, the thermal cracker 62 is a conventional coker unit. Such fractionation can produce one or more of the following renewable fuel products: bio-gasoline, bio-jet fuel, bio-diesel, bio-fuel oil, and/or bio-coke.

In the sixth treatment process, the low-stability bio-oil in line 40b can be combined with a sixth conventional petroleum-derived stream "F" of the refinery 12. The amount of the low-stability bio-oil combined with the sixth petroleum-derived stream F can be at least 0.01, 0.1, 1, or 2 percent and/or not more than 50, 25, 10, or 5 percent by weight of the combined streams. The sixth petroleum-derived stream F can be a heavy residual stream such as, for example, light cycle oil (LCO), and/or light conversion-cycle oil (LCCO), atmospheric residuum (AR), and/or deasphalted oil (DAO). The combining of the low-stability bio-oil and the sixth petroleum-derived stream F can take place upstream of a sixth fractionator 68 of the refinery 12. Alternatively, the combining of the low-stability bio-oil and the sixth petroleum-derived stream F can take place within the fractionator 68. In one embodiment, the sixth fractionator 68 is a conventional coker fractionator. In the fractionator 68, the combined stream can be subjected to fractionation to thereby produce at least two fractionated streams. One of the fractionated streams (e.g., a bio-distillate fraction) exiting the fractionator 68 can then be subjected to hydrotreatment in a sixth hydrotreater 70 of the refinery 12. Another of the fractionated streams exiting the fractionator 68 (e.g., a bio-residual fraction) can then be subjected to thermal cracking in a sixth thermal cracker 72 of the refinery 12. In one embodiment, the thermal cracker 72 is a conventional coker unit. The hydrotreated stream exiting the hydrotreater 70 can be bio-gasoline, bio-jet fuel, bio-diesel, bio-fuel oil, aria/or bio-coke, while the cracked stream exiting the thermal cracker 72 can be referred to as bio-coke.

The bio-gasoline, bio-jet fuel, bio-diesel, and bio-fuel oil produced by the method described herein can have boiling ranges that are typical for conventional gasoline, jet fuel, diesel, and fuel oil, respectively. Accordingly, at least 75, 85, or 95 weight percent of the bio-gasoline produced by the process described herein has a boiling point in the range of 40 to 215° C.; at least 75, 85, or 95 weight percent of the bio-jet fuel produced by the process described herein has a boiling point in the range of 175 to 325° C.; at least 75, 85, or 95 weight percent of the bio-diesel produced by the process described herein has a boiling point in the range of 250 to 350° C.; and at least 75, 85, or 95 weight percent of the bio-fuel oil produced by the process described herein has a boiling point in the range of 325 to 600° C.

EXAMPLES

Example 1

A 65 g sample of a bio-oil, derived from the thermo-catalytic conversion of biomass and containing 11 wt % oxygen and a stability parameter of 0.1 cp/h, was combined with a 35 g quantity of a petroleum-derived LCO stream. Results of the mixing are shown in the Table 1 below. The boiling point ranges were determined using simulated distillation.

TABLE 1

|  | Bio-oil | Petroleum-Derived LCO | Mixture |
| --- | --- | --- | --- |
| Mid-boiling point (° C.) | 220 | 276 | 253 |
| Boiling Point Range (° C.) | 70-520 | 114-420 | 70-510 |
| Oxygen Content (wt %) | 10 | <0.5 | 6.5 |
| TAN (mg KOH/g) | 7 | 0.2 | 4 |
| Wt % boiling below 215 C. | 53 | 13 | 33 |
| Wt % boiling above 325 C. | 24 | 23 | 24 |

The data in Table 1 above demonstrates that high stability bio-oil can be blended with a high proportion of LCO to render a feedstock that can be processed in conventional diesel HDT, since the high boiling point fraction is substantially the same as conventional feeds.

Example 2

An 80 g sample of a bio-oil, derived from the thermo-catalytic conversion of biomass and containing 16 wt % oxygen, and a stability parameter of 32 cp/h, was combined with a 20 g quantity of a petroleum-derived LCO stream. Results of the mixing are shown in the Table 2 below. The boiling point ranges were determined using simulated distillation.

TABLE 2

|  | Bio-oil | Petroleum-Derived LCO | Mixture |
| --- | --- | --- | --- |
| Mid-boiling point (° C.) | 226 | 276 | 253 |
| Boiling Point Range (° C.) | 100-540 | 114-420 | 110-515 |
| Oxygen Content (wt %) | 16 | <0.5 | 12 |
| TAN (mg KOH/g) | 23 | 0.2 | 15 |
| Wt % boiling below 215 C. | 44 | 13 | 36 |
| Wt % boiling above 325 C. | 54 | 23 | 54 |

The data in Table 2 above demonstrates that moderate stability hide-oil can be blended with a lower proportion of LCO to render a feedstock that can be processed in conventional VGO HDT and or FCC units, since the high boiling point fraction is substantially the same as that of typical streams processed in such units.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for producing a renewable fuel, said process comprising:
    (a) providing one or more bio-oils selected from the group consisting of a high stability bio-oil, an intermediate-stability bio-oil, and a low-stability bio-oil, wherein said high stability bio-oil has a stability parameter of less than 30 centipoise per hour (cp/h), said intermediate-stability bio-oil has a stability parameter in the range of 30 to 75 cp/h, and said low stability bio-oil has a stability parameter greater than 75 cp/h; and
    (b) processing at least one of said bio-oils in a petroleum refinery according to one or more of the following methods (i) through (vi)—
        (i) combining at least a portion of said high-stability bio-oil with a first petroleum-derived stream of said petroleum refinery to thereby form a first combined stream, hydrotreating said first combined stream to thereby produce a first hydrotreated stream, and fractionating said first hydrotreated stream;
        (ii) combining at least a portion of said high-stability, bio-oil with a second petroleum-derived stream of said petroleum refinery to thereby form a second combined stream, catalytically cracking said second combined stream to thereby produce a second cracked stream, and fractionating said second cracked stream;
        (iii) combining at least a portion of said intermediate-stability bio-oil with a third petroleum-derived stream of said petroleum refinery to thereby form a third combined stream, hydrotreating said third combined stream to thereby produce a third hydrotreated stream, catalytically cracking at least a portion of said third hydrotreated stream to thereby produce a third cracked stream, and fractionating said third cracked stream;
        (iv) combining at least a portion of said intermediate-stability bio-oil with a fourth petroleum-derived stream of said petroleum refinery to thereby form a fourth combined stream, hydrotreating said fourth combined stream to thereby produce a fourth hydrotreated stream, thermally cracking at least a portion of said fourth hydrotreated stream to thereby produce a fourth cracked stream, and fractionating said fourth cracked stream;

(v) combining at least a portion of said low-stability bio-oil with a fifth petroleum-derived stream of said petroleum refinery to thereby form a fifth combined stream, thermally cracking at least a portion of said fifth combined stream to thereby produce a fifth cracked stream, and fractionating said fifth cracked stream; and/or (vi) combining at least a portion of said low-stability bio-oil with a sixth petroleum-derived stream of said petroleum refinery to thereby form a sixth combined stream, fractionating at least a portion of said sixth combined stream into at least a sixth heavy bio-fraction and a sixth light bio-fraction, hydrotreating at least a portion of said sixth light bio-fraction to thereby produce a sixth hydrotreated bio-fraction, and thermally cracking at least a portion of said sixth heavy bio-fraction to thereby produce a sixth thermally cracked bio-fraction.

2. The process of claim 1 wherein said high-stability bio-oil has an oxygen content of less than 15 weight percent, said intermediate-stability bio-oil has an oxygen content in the range of from 15 to 18 weight percent, and said low-stability bio-oil has an oxygen content greater than 18 weight percent.

3. The process of claim 1 wherein said providing of step (a) includes thermochemically converting biomass in a conversion reactor, wherein said biomass comprises lignocellulose.

4. The process of claim 2 wherein said converting of said biomass is by fast pyrolysis and wherein said conversion reactor is a riser reactor.

5. The process of claim 1 wherein said first, second, third, fourth, fifth, and/or sixth petroleum-derived streams are each separately selected from the group consisting of virgin gasoil/diesel, light cycle oil (ECO), light catalytic-cycle oil (LCCO), atmospheric residue (AR), deasphalted oil (DAO), heavy crude oil (HCO), heavy catalytic-cycle oil (HCCO), vacuum gas oil (VGO), vacuum residue (VR), and combinations thereof.

6. The process of claim 1 wherein each of said fractionating of methods (i), (ii), (iii), (iv), and/or (v) separately produce at least one product stream selected from the group consisting of bio-gasoline, a bio-jet fuel, a bio-diesel, a bio-fuel-oil, and combinations thereof wherein at least 75 weight percent of said bio-gasoline has a boiling point in the range of 40 to 215° C., wherein at least 75 weight percent of said bio-jet fuel has a boiling point in the range of 175 to 325° C., wherein at least 75 weight percent of said bio-diesel has a boiling point, in the range of 250 to 350° C., and wherein at least 75 weight percent of said bio-fuel-oil has a boiling point in the range of 325 to 600° C.

7. The process of claim 1 wherein step (a) provides at east said high-stability bio-oil, wherein step (b) comprises method (i) and/or (ii).

8. The process of claim 7 wherein step (b) comprises method (i).

9. The process of claim 8 wherein said hydrotreating of method (i) is carried out a diesel hydrotreating unit of said petroleum refinery.

10. The process of claim 7 wherein step (b) comprises method (ii).

11. The process of claim 10 wherein said catalytic cracking of method (ii) is carried out in a resid fluid catalytic cracking (RFCC) unit or in a fluid catalytic cracking (FCC) unit of said petroleum refinery.

12. The process of claim 7 wherein said first and/or second petroleum-derived streams comprise virgin gasoil/diesel, light cycle oil (LCO), light catalytic-cycle oil (LCCO), atmospheric residue (AR), deasphalted oil (DAO), vacuum as oil (VGO), heavy catalytic-cycle oil (HCCO), and, or vacuum residue (VR).

13. The process of claim 1 wherein step (a) provides at least said intermediate-stability bio-oil, wherein step (b) comprises method (iii) and/or (iv).

14. The process of claim 13 wherein step (b) comprises method (iii).

15. The process of claim 14 wherein said catalytic cracking of method (iii) is carried out in a fluid catalytic cracking (FCC) unit of said petroleum refinery.

16. The process of claim 13 wherein step (b) comprises method (iv).

17. The process of claim 16 wherein said thermally cracking of method (iv) is carried out in a hydrocracking unit of said petroleum refinery.

18. The process of claim 13 wherein said third and/or fourth petroleum-derived streams are selected from the group consisting of light cycle oil (LCO), and/or light conversion-cycle oil (LCCO), deasphalted oil (DAO), vacuum gas oil (VGO), heavy catalytic-cycle oil (HCCO), and combinations thereof.

19. The process of claim 1 wherein step (a) provides at least said low-stability bio-oil, wherein step (b) comprises method (v) and/or (vi).

20. The process of claim 19 wherein step (b) comprises method (v).

21. The process of claim 20 wherein said thermally cracking of method (v) is carried out in a coker unit of said petroleum refinery.

22. The process of claim 19 wherein step (b) comprises method (vi).

23. The process of claim 22 wherein said thermally cracking of method (vi) is carried out in a coker unit of said petroleum refinery.

24. The process of claim 22 wherein said fractionating of method (vi) occurs in a coker fractionator.

25. The process of claim 19 wherein said fifth and/or sixth petroleum-derived stream is selected from the group consisting of light cycle oil (LCO), and/or light conversion-cycle oil (LCCO), atmospheric residue (AR), deasphalted oil (DAO), vacuum residue (VR), and combinations thereof.

* * * * *